United States Patent Office 2,699,446
Patented Jan. 11, 1955

2,699,446

HALOMETHANE ADDITION PRODUCTS OF POLYMERIZED ALKYL ACRYLATES

Joseph E. Fields, Dayton, Ohio, assignor to Monsanto Chemical Company, St. Louis, Mo., a corporation of Delaware No Drawing. Application December 24, 1952, Serial No. 327,931

11 Claims. (Cl. 260—485)

The present invention relates to addition products and more particularly provides new and valuable adducts of butyl or amyl acrylate and certain polyhalomethanes.

The new adducts are prepared by the free radical-catalyzed reaction of the acrylate with the polyhalomethane substantially according to the scheme:

$$CX_4 + nCH_2{:}CHCOOR \longrightarrow X(CH_2.\overset{|}{C}H.COOR)_nCX_3$$

in which X is selected from the class consisting of hydrogen, chlorine and bromine, and in which not more than one X is hydrogen, R is selected from the class consisting of alkyl radicals of 4 and 5 carbon atoms and $n$ is a number of from 14 to 105.

Polyhalomethanes suitable for the present purpose are, e. g., carbon tetrachloride, carbon tetrabromide, chloroform, bromoform, bromotrichloromethane, chlorotribromomethane, dichlorodibromomethane, etc. Useful alkyl acrylates are n-butyl, isobutyl, tert-butyl, n-amyl, isoamyl and tert-amyl acrylates. A mixture of a butyl and an amyl acrylate or mixtures of the various isomeric butyl acrylates or of the isomeric amyl acrylates may be used.

The present halomethane-butyl or amyl acrylate adducts have a molecular weight of from about 2,000 to 15,000. They are stable, viscous liquids which may be employed for a variety of commercial and industrial purposes, but are especially useful as antifoaming agents for hydrocarbon oils. When added to such oils in very small proportions, say in quantities of as low as from 5 to 10 parts by weight per million parts of oil, they possess the property of reducing or completely inhibiting formation of foam or froth in base stock or compounded oils. The very high antifoaming efficiency of the present addition compounds is particularly noteworthy in that similarly prepared adducts of the polyhalomethanes and the butyl or amyl esters of methacrylic, rather than of acrylic acid do not function as antifoaming agents when added to hydrocarbon oils even at concentrations which are as much as a hundred or a thousand times as great as those at which the butyl or amyl acrylate-polyhalomethane adducts exhibit high antifoaming activity. Also unexpected is the fact that adducts of polyhalomethane and close homologs of the present alkyl acrylates likewise demonstrate little, if any, antifoaming effect. Thus, a liquid mixture of propyl acrylate-carbon tetrachloride adducts having an average molecular weight of 3030 has substantially no effect on the foam-susceptibility of a 30 SAE base hydrocarbon oil when added thereto in a concentration of 50 p. p. m.; whereas a mixture of butyl acrylate-carbon tetrachloride adducts having an average molecular weight of 3680 completely inhibits foaming when added to the same oil at the same concentration; and a mixture of amyl acrylate-carbon tetrachloride adducts having an average molecular weight of 3100 completely inhibits formation of foam when added to the same oil even at a concentration of 10 parts of adducts per million parts of oil.

The present adducts are readily obtainable by contacting the halomethane compound with the acrylate at ordinary or increased temperatures in the presence of a free-radical-liberating agent as catalyst until formation of adducts having the desired viscosity characteristics has taken place. The reaction may be effected by mixing together the halomethane, ester and catalyst and maintaining the resulting mixture, advantageously with agitation, at a temperature which permits steady decomposition of the catalyst and consequent steady liberation of halomethyl free-radicals. Or, if desired, the ester may be added gradually, e. g., dropwise, to the halomethane, while constantly maintaining an optimum quantity of active catalyst in the reaction zone, which zone is preferably kept at a temperature conducive to the formation of free-radicals. Depending upon the nature of the individual reactants and catalyst and the properties desired in the final product, increased temperatures, e. g., temperatures of from above room temperature to about 125° C. may be generally employed. The reaction time may vary from, say, several hours to several days. Substantially equimolar quantities of the halomethane and the ester may be used; however, for the production, in good yields, of adducts having an average molecular weight of from 2,000 to 15,000, an excess of the halomethane is preferred. An excess of the ester is not recommended. Variation of catalyst quantity has been found to have a definite effect on the nature of the adduct. While catalyst quantities of up to 10% based on the weight of the ester may be used, I have found that generally a catalyst range of from 0.1% to 5% is preferable. The use of the greater proportions of catalyst within this range tends to favor formation of the lower molecular-weight adducts, and the use of lower quantities of catalyst tends to favor formation of the high molecular-weight adducts, i. e., adducts having a molecular weight of from, say, 5,000 to 7,000. The average molecular weight of the adducts is also influenced by other variables, e. g., ratio of ester to halomethane and temperature, etc.

Formation of the present adducts probably proceeds through a chain mechanism, with termination of the chain at an early stage, i. e., at a point at which no more than 105 moles of the ester have added to one mole of the halomethane. Depending upon the nature and the quantity of the reactants and of the free-radical-liberating agent, as well as upon the reaction conditions, chain propagation may be terminated at various stages to yield products in which from 14 to 105 moles of the ester have added to one mole of the polyhalomethane compound.

An extraneous, inert solvent or diluent, e. g., benzene or hexane may be employed, either to serve as catalyst solvent, to mitigate reaction heat, or to dilute the concentration of the ester in the reaction mixture. The use of such a solvent or diluent, however, is generally of little economic advantage.

Free-radical-liberating agents which may be employed in promoting addition of the present acrylates to the polyhalomethanes are compounds which will decompose to give free radicals. Such compounds include peroxygen-type catalysts, for example, acyl peroxides such as acetyl, benzoyl, lauroyl, or stearoyl peroxides; hydrocarbon peroxides or hydroperoxides such as di-tert-butyl peroxide, di-tert-amyl peroxide, tert-butyl hydroperoxide, cumene hydroperoxide or p-cymene hydroperoxide; and inorganic per-compounds such as hydrogen peroxide, sodium peroxide, sodium perborate, potassium persulfate, and alkali percarbonates; hydrazine derivatives such as hydrazine hydrochloride and dibenzoyl hydrazine; organometallic compounds such as tetraethyl lead, etc. For convenience, the peroxygen-type catalysts will be hereinafter referred to as peroxidic compounds. Only catalytic quantities of the free-radical-liberating agent need be employed in promoting the addition reaction. Ultraviolet light may be employed with the catalyst or as the sole catalytic agent.

The invention is further illustrated, but not limited, by the following examples.

Example 1

This example shows the preparation of various halomethane-alkyl acrylate adducts and evaluation of the same as antifoaming agents for hydrocarbon oils.

The antifoaming properties of hydrocarbon oils may be determined according to the procedure generally described in Designation L–12–445 of the Coordinating Lubricants Research Committee of the Coordinating Research Council, New York. Briefly this procedure involves bubbling air or an inert gas such as nitrogen through the hydrocarbon oil to be tested employing standard apparatus and standard conditions.

The oil was placed in a standard 1000-ml. graduated cylinder in the top of which was inserted a two-hole rubber stopper. An air-inlet tube extended through this stopper, to the bottom of which was attached a 1-in. diameter gas diffuser stone sphere. The length of the inlet tube was adjusted so that when the apparatus was assembled, the sphere just touched the bottom of the cylinder.

Dry nitrogen or air was supplied at the rate of 0.2 cubic foot per hour, employing a calibrated flowmeter. The sample was heated to 120° F. (48.9° C.), and then cooled, before testing, to 75°±5° F. (23.9°±2.8° C.) in a constant temperature room. Champlin 30 SAE base oil (200 cc.) was used for each test.

With the air hose disconnected between the flowmeter and the delivery tube to the diffuser stone, the stone was allowed to soak in the oil for 5 minutes, at the end of which time the air flow (0.2 cu. ft. per hour) was started through the stone. Zero time was noted when the air bubbles started to rise from the stone. Readings of the top and bottom foam levels were taken at the end of a 5-minute period. The volume of foam was calculated from the two readings.

A series of higher halomethane-alkyl acrylate adducts was prepared as follows:

The alkyl acrylate was mixed with the halomethane and the catalyst in the proportions shown below, and bottles of the respective mixtures were maintained on a rotating rack at a temperature of from 90–95° C. for 48 hours. At the end of that time any unreacted material was removed by distilling through a 10" Vigreux column. The residues were halomethane-alkyl acrylate adducts having the average molecular weights given below, as based on halogen content of the adducts. The following results were obtained:

| Mixture of Adducts | Foam, cc., at 5 Min., Adducts in P. P. M. | | | | |
|---|---|---|---|---|---|
| | None | 50 | 10 | 5 | 2 | 1 |
| From .3 M Et acrylate, .73 g. Bz$_2$O$_2$, and .6 M CCl$_4$; 34.4 g. adducts, 9.24% Cl, M. W. 1,535 | 710–720 | | | | | |
| From .263 M Pr acrylate, 1.5 g. Bz$_2$O$_2$, 1 M CCl$_4$; 31.7 g. adducts, 4.69% Cl, M. W. 3,030 | | 705 | | | | |
| From 2 M Bu acrylate, 6.5 g. Bz$_2$O$_2$, 10 M CCl$_4$; 510 g. adducts, 3.58% Cl, M. W. 3,950 | | 750 | | | | |
| From 2 M Bu acrylate, 7.5 cc. of 75% Cumene hydroperoxide, 10 M CCl; 220 g. adducts, 2.13% Cl, M. W. 6,650 | | | 10 | 165 | 420 | |
| From .3 M Bu acrylate, .6 M CCl$_4$, .872 g Bz$_2$O$_2$; 37.1 g. adducts, 2.65% Cl, M. W. 5,350 | | | 0 | 0 | 20 | |
| From .3 M Bu acrylate, .9 M CHCl$_3$, 1.94 g. Cumene hydroperoxide; 39.2 g. adducts, 1.59% Cl, M. W. 6,690 | | | 0 | 10 | 30 | 270 |
| From 30 g. Bu acrylate, 154 g. CCl$_4$, 1.5 g. Bz$_2$O$_2$; 32 g. adducts, 3.98% Cl, M. W. 3,560 | | | 0 | 0 | 65 | |
| From 2 M Bu acrylate, 10 M CHCl$_3$, 6.5 g. Bz$_2$O$_2$; 505 g. adducts, 2.08% Cl, M. W. 5,130 | | 55 | | | | |
| From 8 M Bu acrylate, 40 M CHCL$_3$, 20.5 g. Bz$_2$O$_2$; 982 g. adducts, M. W. 5,330 | | | 0 | 0 | 20 | |
| From .23 M Bu acrylate, .46 M CHCl$_3$, 40 cc. benzene, 1% Bz$_2$O$_2$; 31 g. adducts, .79% Cl; M. W. 13,450 | | | 0 | 10 | 100 | |
| From 30 g. Amyl acrylate, 119 g. CHCl$_3$, .6 g. Bz$_2$O$_2$ 28 g. adducts, M. W. 5,700 | | | 0 | 10 | 25 | |
| From .211 M Am. acrylate, 1.5 g. Bz$_2$O$_2$, 1 M CCl$_4$; 31 g. adducts, 4.6% Cl, M. W. 3,100* | | 0 | 0 | 0 | 20 | |
| From .211 M Am. acrylate, .6 g. Bz$_2$O$_2$, 1 M CCl$_4$; 30.3 g. adducts, 3.12% Cl, M. W. 4,550 | | | | 0 | 10 | 140 |
| From .2 M 2-ethylhexyl acrylate, .6 M CCl$_4$, 1.84 g. Bz$_2$O$_2$; 37.1 g. adducts, 2.4% Cl, M. W. 5,765* | | 0 | 0 | 0 | 10 | 85 |
| | | 780 | | | | |

* Reaction time 4 days instead of 48 hours.

The above results show that while the antifoaming effect of the butyl and amyl acrylate adducts varies somewhat with the nature of the alkyl radical and with the average molecular weight of the adduct, very good antifoaming activity is obtained with the butyl and amyl acrylate adducts even at very low concentrations. Within the concentration range of from one to 50 parts per million (0.0001% to 0.005%) the amyl acrylate polymer provides the optimum antifoaming activity. The nature of the chain terminator appears to be of little effect, the chloroform adduct of butyl acrylate being as good as the corresponding carbon tetrachloride adduct.

As shown above, the halomethane-propyl acrylate or 2-ethylhexyl acrylate adducts possess no antifoaming activity.

Example 2

This example shows preparation and testing of various halomethane-alkyl acrylates, using a small-scale testing procedure. The tests were conducted substantially as in Example 1, except that instead of employing a 1,000 ml. graduate as in Example 1, a 100-ml. graduate was employed, and there was only used 30 ml. of oil. Also, in order to show the efficacy of the butyl or amyl acrylate-halomethane adducts when employed with various oils, three different oils were used. In the following table, these are denoted as follows:

(1) Mid-Continent, solvent-refined SAE 30
(2) Mid-Continent, solvent-refined SAE 10
(3) Champlin SAE 30

The adducts were prepared from the indicated ester and polyhalomethane employing procedure described in Example 1 above. The following results were obtained:

| Adduct | Molecular Weight | Base Oil | Foam, cc., at 50 p. p. m., Results |
|---|---|---|---|
| none | | | over 70. |
| Butyl acrylate—CCl$_4$ | 2,000 | 1 | No foam. |
| Do | 3,528 | 2 | Do. |
| Do | 4,807 | 2 | Do. |
| Do | 5,011 | 1 | Do. |
| Do | 5,352 | 1 | Do. |
| Do | 3,253 | 2 and 3 | Do. |
| Do | 4,565 | 2 and 1 | Do. |
| Do | 5,266 | 2 and 3 | Do. |
| Do | 6,630 | 1 | Do. |
| Butyl acrylate—CHBr$_3$ | 2,899 | 1 | Do. |
| Do | 3,316 | 2 | Do. |
| Do | 2,103 | 1 | Do. |
| Ethyl acrylate—CCl$_4$ | 2,626 | 1 | over 70. |

Example 3

This example shows the preparation of a butyl acrylate-carbon tetrachloride adduct by gradual addition of the ester to the halide. 1538 g. (10 moles) of carbon tetrachloride and 5 cc. of a solution of 6.41 g. benzoyl peroxide in 85 cc. of carbon tetrachloride were placed in a flask equipped with a reflux condenser. To this there was then added dropwise, during a period of 4 hours and at refluxing temperature, 128.2 g. (1 mole) of butyl acrylate while adding the remainder of the benzoyl peroxide solution to the reaction mixture at 15 minute intervals. After all of the ester and the catalyst solution had been added, the whole was refluxed (77.5° C.) for 2 hours. The unreacted carbon tetrachloride was then stripped off to yield as residue 130 g. of the viscous, yellowish amber adduct, analyzing 3.86% chlorine and having a molecular weight of 3680. Testing of the adduct by the procedure of Example 2, using a Champlin SAE 30 base oil showed no foam at 50 p. p. m.

Example 4

For purposes of comparison, products were prepared from various alkyl methacrylates and carbon tetrachloride, employing the procedure generally described in Example 1 with the reactants shown below:

PRODUCTS

From 30 g. (.193 mole) amyl methacrylate, 1.5 g. Bz$_2$O$_2$, 1 M CCl$_4$; 32 g. adducts, 2.6% Cl; M. W. 5450
From 30 g. (1.77 mole) hexyl methacrylate, 1.5 g. Bz$_2$O$_2$, 1 M CCl$_4$; 32 g. adducts, 4.5% Cl; M. W. 3100
From 30 g. octyl methacrylate, 1.5 g. Bz$_2$O$_2$, 1 M CCl$_4$; 30 g. adducts, 3.83% Cl; M. W. 3700
From .235 M isopropyl methacrylate, 1 M CCl$_4$, 5% Bz$_2$O$_2$; 30 g. product, 3.39% Cl; M. W. 4180

Evaluation of the first 3 products above, using the testing procedure of Example 1, showed that even at 500 p. p. m. the first product gave 950 cc. of foam, the second product gave 660 cc. of foam, and the third, 800 cc. of foam as against the blank foam value of 710–720 cc. Testing of the fourth product by the small scale testing procedure of Example 2, gave a foam value of over 70 cc. at 50 p. p. m. which is the value obtained in the absence of additive. Accordingly, it is obvious that instead of depressing foam-susceptibility the methacrylate products either have the opposite effect, i. e., they induce foaming, or they have no substantial effect.

While the present acrylate adducts are very advantageously used as anti-foaming inhibitors for hydrocarbon oils, they may also be employed for a variety of other industrial purposes, e. g., as plasticizers for natural or synthetic resins and plastics, as heat-transfer media, dielectric fluids, etc.

Use of the present adducts as antifoaming agents is disclosed in my copending application, Serial No. 281,680, filed April 10, 1952 now abandoned.

This application is a continuation-in-part of my application, Serial No. 192,335, filed October 26, 1950 now abandoned.

What I claim is:

1. Adducts of an alkyl acrylate and a polyhalomethane having the formula $$X(CH_2.CH.COOR)_nCX_3$$

in which X is selected from the class consisting of hydrogen and chlorine and in which not more than one X is hydrogen and R is selected from the class consisting of alkyl radicals of 4 and 5 carbons atoms, and $n$ is a number of from 14 to 105.

2. Adducts of carbon tetrachloride and butyl acrylate having the formula $$Cl(CH_2.CH.COOCH_2(CH_2)_2CH_3)_nCCl_3$$

in which $n$ is a number of 14 to 105.

3. Adducts of carbon tetrachloride and amyl acrylate having the formula $$Cl(CH_2.CH.COOCH_2(CH_2)_3CH_3)_nCCl_3$$

in which $n$ is a number of from 14 to 105.

4. Adducts of chloroform and butyl acrylate having the formula $$H(CH_2.CH.COOCH_2(CH_2)_2CH_3)_nCCl_3$$

in which $n$ is a number of from 14 to 105.

5. Adducts of chloroform and amyl acrylate having the formula $$H(CH_2.CH.COOCH_2(CH_2)_3CH_3)_nCCl_3$$

in which $n$ is a number of from 14 to 105.

6. The method which comprises contacting, in the presence of a free-radical liberating agent an ester selected from the class consisting of butyl and amyl acrylate with a polyhalomethane having the formula $CX_4$ in which X is selected from the class consisting of hydrogen and chlorine and in which not more than one X is hydrogen and recovering from the resulting reaction products adducts having the formula $$X(CH_2.CH.COOR)_nCX_3$$

in which X is selected from the class consisting of hydrogen and chlorine and in which not more than one X is hydrogen, R is selected from the class consisting of alkyl radicals of 4 and 5 carbon atoms, and $n$ is a number of from 14 to 105.

7. The method which comprises contacting, in the presence of a peroxidic agent as catalyst, an ester selected from the class consisting of butyl and amyl acrylate with a polyhalomethane having the formula $CX_4$ in which X is selected from the class consisting of hydrogen and chlorine and in which not more than one X is hydrogen, and recovering from the resulting reaction products adducts having the formula $$X(CH_2.CH.COOR)_nCX_3$$

in which X is selected from the class consisting of hydrogen and chlorine and in which not more than one X is hydrogen, R is selected from the class consisting of alkyl radicals of 4 and 5 carbon atoms, and $n$ is a number of from 14 to 105.

8. The method which comprises contacting carbon tetrachloride with butyl acrylate in the presence of a peroxidic agent as catalyst and recovering from the resulting reaction product adducts in which from 14 to 105 moles of said acrylate are combined with one mole of the carbon tetrachloride.

9. The method which comprises contacting carbon tetrachloride with amyl acrylate in the presence of a peroxidic agent as catalyst and recovering from the resulting reaction product adducts in which from 14 to 105 moles of said acrylate are combined with one mole of the carbon tetrachloride.

10. The method which comprises contacting chloroform with butyl acrylate in the presence of a peroxidic agent as catalyst and recovering from the resulting reaction product adducts in which from 14 to 105 moles of said acrylate are combined with one mole of the chloroform.

11. The method which comprises contacting chloroform with amyl acrylate in the presence of a peroxidic agent as catalyst and recovering from the resulting reaction product adducts in which from 14 to 105 moles of said acrylate are combined with one mole of the chloroform.

References Cited in the file of this patent

UNITED STATES PATENTS

| | | |
|---|---|---|
| 2,434,054 | Roedel | Jan. 6, 1948 |
| 2,440,800 | Hanford | May 4, 1948 |
| 2,492,170 | Mast | Dec. 27, 1949 |
| 2,515,306 | Ladd | July 18, 1950 |